(12) United States Patent
Klause

(10) Patent No.: US 11,259,544 B2
(45) Date of Patent: Mar. 1, 2022

(54) METHODS OF PREPARING A STRATIFIED FROZEN CONFECTION FOR HAND CONSUMPTION, AND RELATED CONFECTIONS

(71) Applicant: Louis G. Klause, Somers Point, NJ (US)

(72) Inventor: Louis G. Klause, Somers Point, NJ (US)

( * ) Notice: Subject to any disclaimer, the term of this patent is extended or adjusted under 35 U.S.C. 154(b) by 446 days.

(21) Appl. No.: 14/528,497

(22) Filed: Oct. 30, 2014

(65) Prior Publication Data

US 2015/0118363 A1 Apr. 30, 2015

Related U.S. Application Data

(60) Provisional application No. 61/897,599, filed on Oct. 30, 2013.

(51) Int. Cl.
| | | |
|---|---|---|
| *A23G 9/48* | (2006.01) | |
| *A23G 9/08* | (2006.01) | |
| *A23G 9/04* | (2006.01) | |
| *A23G 9/28* | (2006.01) | |

(52) U.S. Cl.
CPC ............... *A23G 9/48* (2013.01); *A23G 9/04* (2013.01); *A23G 9/286* (2013.01)

(58) Field of Classification Search
CPC ............. A23G 9/04; A23G 9/48; A23G 9/286
USPC .................................................. 426/101, 100
See application file for complete search history.

(56) References Cited

U.S. PATENT DOCUMENTS

| | | | |
|---|---|---|---|
| 1,445,187 A | 2/1923 | Vaughan | |
| 1,802,306 A | 4/1931 | Baker | |
| 1,802,698 A | 4/1931 | Blanchard | |
| 1,813,099 A | 7/1931 | Story | |
| 1,869,464 A * | 8/1932 | Clark | A23G 9/44 |
| | | | 426/95 |
| 1,899,511 A | 2/1933 | Leaf | |
| 1,950,734 A * | 3/1934 | Leaf | A47J 43/282 |
| | | | 426/95 |
| 1,968,732 A | 7/1934 | Anagnos | |
| 2,004,863 A * | 6/1935 | Gibson | A23G 9/506 |
| | | | 426/102 |
| 2,085,495 A * | 6/1937 | Fulkerson | A23G 9/44 |
| | | | 426/101 |
| 2,092,160 A | 9/1937 | Hawerlander | |
| 2,191,352 A | 2/1940 | Oprean | |
| 2,347,162 A * | 4/1944 | Watts | A23G 9/286 |
| | | | 426/249 |
| 2,511,082 A | 6/1950 | Rubin | |
| 2,570,031 A | 10/1951 | Gibson | |
| 2,660,964 A * | 12/1953 | Moser | B65B 39/00 |
| | | | 222/567 |
| 2,851,365 A | 9/1958 | Perrozzi | |
| 2,927,542 A | 3/1960 | Moser | |
| 2,950,200 A * | 8/1960 | Jones | A23G 9/04 |
| | | | 426/101 |
| 3,083,651 A | 4/1963 | Cooper | |
| 3,196,809 A | 7/1965 | Nelson et al. | |
| 3,481,282 A | 12/1969 | Reynolds | |
| 3,547,051 A * | 12/1970 | Komberec | A23G 9/286 |
| | | | 426/274 |
| 3,769,039 A | 10/1973 | Kleinert | |
| 4,020,188 A | 4/1977 | Forkner | |
| 4,171,380 A | 10/1979 | Forkner | |

(Continued)

FOREIGN PATENT DOCUMENTS

| | | | | |
|---|---|---|---|---|
| CL | WO 0243505 A2 | * | 6/2002 | ............... A23G 9/24 |
| CN | 1510991 A | * | 7/2004 | ............... A23G 9/24 |
| EP | 0733308 A2 | * | 9/1996 | ............... A23G 9/08 |

OTHER PUBLICATIONS http://research.omicsgroup.org/index.php/Viennetta—Vienetta date 1982; 3 pages.*
Merriam Webster's Dictionary, Tenth Edition, 1997, p. 117, Definition of biscuit.*
https://dictionary.cambridge.org/us/dictionary/english/wafer, May 28, 2018.*
Marshall et al., "Ice Cream", Aspen Publication, 2000, pp. 39 and 40.*

(Continued)

*Primary Examiner* — Jyoti Chawla
(74) *Attorney, Agent, or Firm* — Flaster/Greenberg, PC

(57) ABSTRACT

The invention encompasses methods of preparing a stratified frozen confection for hand consumption and the related confection. The methods include filling an aliquot container defining a three dimensional shape with at least one open end with an amount of a frozen material, reducing the temperature of the frozen material within the scoop to about −12.2° C. (10° F.) or less; placing a first surface of the frozen material in contact with an interior surface of a first substrate, the first substrate having a length dimension an a width dimension; removing the frozen material from the aliquot container. The first surface of the frozen material is in contact with the interior surface of the first substrate and a second surface of the frozen material is positioned in a plane above the plane of the first substrate. Thereafter, the methods include manipulating the second surface of the frozen material to place at least one cavity in the second surface; disposing upon the second surface of the frozen material an amount of a filling to form a filling layer that has a first surface that is in contact with the second surface of the frozen material and a second surface; applying a second substrate to the second surface of the filling, the second substrate having a width dimension and a length dimension. Thus, a stratified frozen confection having at least two layers disposed between a first substrate and a second substrate is formed.

16 Claims, No Drawings

(56) References Cited

U.S. PATENT DOCUMENTS

| | | | |
|---|---|---|---|
| 4,427,703 | A | 1/1984 | Schäfer et al. |
| 4,430,351 | A | 2/1984 | Cillario |
| 4,507,326 | A | 3/1985 | Tarantino |
| 4,542,028 | A | 9/1985 | Butcher et al. |
| 4,563,363 | A | 1/1986 | Yoon |
| 4,789,552 | A | 12/1988 | Speakman et al. |
| 4,820,533 | A | 4/1989 | Seaborne et al. |
| 4,963,379 | A | 10/1990 | Ferrero |
| 4,971,816 | A | 11/1990 | Clark et al. |
| 4,976,978 | A | 12/1990 | Schubert |
| 5,652,005 | A | 7/1997 | Loalbo |
| 5,789,008 | A | 8/1998 | Monte |
| 6,039,988 | A | 3/2000 | Monte |
| 6,103,279 | A | 8/2000 | Ferrero |
| 6,156,357 | A | 12/2000 | Franklin |
| 6,174,157 | B1 | 1/2001 | Daouse et al. |
| 6,231,899 | B1 | 5/2001 | Rosso |
| 6,338,863 | B1 | 1/2002 | Amiel et al. |
| 6,399,125 | B1 | 6/2002 | Kershman et al. |
| 6,861,082 | B2 | 3/2005 | Laffont et al. |
| 6,958,165 | B2 | 10/2005 | Tence et al. |
| 7,582,321 | B2 | 9/2009 | Mihalos et al. |
| 2002/0015764 | A1 | 2/2002 | Laffont et al. |
| 2003/0203077 | A1* | 10/2003 | Charles .................. A23G 9/286 426/100 |
| 2004/0047950 | A1 | 3/2004 | Gambino et al. |
| 2006/0093708 | A1 | 5/2006 | Yaseem et al. |
| 2006/0093719 | A1 | 5/2006 | Nelson |
| 2006/0102016 | A1 | 5/2006 | Ulrich et al. |
| 2006/0115557 | A1 | 6/2006 | Schlienger et al. |
| 2008/0305218 | A1* | 12/2008 | Kahn ....................... A23G 9/48 426/91 |
| 2009/0130264 | A1 | 5/2009 | Bartkowska et al. |
| 2009/0214720 | A1 | 8/2009 | Almenares et al. |
| 2010/0209562 | A1 | 8/2010 | Henriet et al. |
| 2011/0177209 | A1* | 7/2011 | Farina .................... A23G 9/282 426/89 |

OTHER PUBLICATIONS

Corresponding Office Action dated Jan. 26, 2016 from Canadian Application No. 2,875,273 (3 pages).

Corresponding Office Action dated Oct. 2, 2017 from Canadian Application No. 2,875,273 (4 pages).

* cited by examiner

METHODS OF PREPARING A STRATIFIED FROZEN CONFECTION FOR HAND CONSUMPTION, AND RELATED CONFECTIONS

CROSS REFERENCE TO RELATED APPLICATION

This application claims the benefit of priority under 35 U.S.C. § 119(e) to U.S. Provisional Patent Application No. 61/897,599, filed Oct. 30, 2013, entitled, "Methods of Preparing a Stratified Frozen Confection For Hand Consumption, and Related Confections," the entire disclosure of which is incorporated herein by reference.

BACKGROUND OF THE INVENTION

Ice cream confections consumable from the hand, such as ice cream cones, ice cream sandwiches, etc. are very popular with consumers, especially in the summer months and at fairs, farmer's markets, amusement parks and other locales where one may not wish to sit down at a table to consume a refreshing cold snack.

Numerous examples of such confections exist, and include those that can be purchased in boxes or unitarily from a consumer's market for home use. However, because of the conventional mass production processes use to prepare these confections, the confections have a uniform, assembly-line-produced aesthetic, lacking the rustic, home-made aesthetic that many consumers prefer and seek out, particularly at an upscale price point.

One type of confection enjoyed by consumers is an "ice cream sandwich". Conventional ice cream sandwiches consist of a slab of ice cream disposed between two cookies or biscuits. Often, the cookies are dry, tasteless and cardboard-like, particularly in the mass production version of the confection. These poor organoleptic properties have been a necessary byproduct of producing a cookie capable of bearing the weight and moisture content of the ice cream under long term storage conditions and during hand-to-mouth consumption.

Prior art attempts to prepare production scale ice cream sandwiches have been made. However, such apparatuses and methods do not permit insertion of a separate, non-ice cream layer of flavored material of various viscosities placed separately on each ice cream sandwich portion. U.S. Pat. No. 2,927,542, entitled Apparatus for Making Ice Cream Sandwiches, the contents of which are incorporated herein by reference, teaches an ice cream sandwich containing plastic flavoring material or sauce placed on the ice cream layer. However, such plastic flavoring material is of a uniform viscosity and disposed via extrusion into "conduits" placed in the ice cream layer.

Thus, there remains a need in the art for preparation of a homemade-tasting, rustic looking, stratified confection providing a unique organoleptic experience for the consumer.

BRIEF SUMMARY OF THE INVENTION

The invention encompasses methods of preparing a stratified frozen confection for hand consumption and the related confection. The methods include filling an aliquot container defining a three dimensional shape with at least one open end with an amount of a frozen material, the frozen material having a viscosity of about 50 cP to about 5000 cP and an internal temperature of about −3.3° C. (26° F.) or greater, reducing the temperature of the frozen material within the scoop to about −12.2° C. (10° F.) or less; placing a first surface of the frozen material in contact with an interior surface of a first substrate, the first substrate having a length dimension an a width dimension; removing the frozen material from the aliquot container, thereby forming a substrate having a layer of frozen material disposed upon the substrate's interior surface. The first surface of the frozen material is in contact with the interior surface of the first substrate and a second surface of the frozen material is positioned in a plane above the plane of the first substrate.

Thereafter, the methods include manipulating the second surface of the frozen material to place at least one cavity in the second surface; disposing upon the second surface of the frozen material an amount of a filling, wherein the filling has an internal temperature of up to about 20° C., to form a filling layer that has a first surface that is in contact with the second surface of the frozen material and a second surface; applying a second substrate to the second surface of the filling, the second substrate having a width dimension and a length dimension.

Thus, a stratified frozen confection having at least two layers disposed between a first substrate and a second substrate is formed.

The invention also includes related confections, which may be made by the same methods.

DETAILED DESCRIPTION OF THE INVENTION

The methods of the invention described herein allow for one or more layers of flavored material (each having various viscosities and/or solids) to be deposited on each individual confection; the inventive process permits large scale efficient production of the confection, wherein each individual confection has a different aesthetic aspect (a "homemade" or "rustic" look), thereby increasing its organoleptic and aesthetic properties, and enhancing its desirability to a consumer.

The invention allows the ice cream sandwiches to be produced at an industrial scale, while maintaining a "homemade" look to a mass produced item. Additionally, the separate layers of flavored material greatly enhance the taste sensation of the ice cream sandwich by allowing the consumer to experience distinct flavors in each bite plus a delicious aftertaste as the flavors combine in the mouth.

The appeal of traditional ice cream sandwiches is the experience of tasting two different flavors and textures, the cookie and the ice cream, with each bite and the convenience of it being a hand held treat. The methods of the invention permit the preparation of a stratified frozen confection that can be consumed from the hand (no utensils) in the manner of street or county fair food.

The invention includes a step of filing an aliquot container that defines a three-dimensional shape and at least one open end with an amount of a frozen material. The container may be made of any food-safe material know or to be developed in the art Such materials may include, for example, stainless steel, plastics, porcelains, silicones, ceramics, metals, paper, cardboard, wood polymer, and similar materials. If desired, the interior of the container may be coated or lined with a permanent or non-permanent material that facilitates release of the frozen material, such as, for example, an oil, a polymer or a textured surface. In alternative embodiments, the container may be adapted to release the frozen material, either by mechanical or other means. For example, the container may be capable of heating to a specific temperature that facilities release of the frozen material. Alternatively, the interior of the container may container a scoop or push element that mechanical releases the frozen material from the container.

The container may be of any three dimensional shape, such as for example, a polyhedron, a sphere, a hemisphere, a semihemisphere, a rectangular prism, a cone, a cube, a cylinder, a pyramid, a triangular prism, and a hexagonal prism, and may have an interior of may volume. Depending on the size of the confection to be made, it may be preferred that the volume and/or dimensions of the container are approximately sufficient to hold a single serving size of a frozen material. As an example, it may be desired that the container has a width dimension of about 2 cm to about 15 cm and a length dimension of about 5 cm to about 30 cm.

It may be preferred that the container has at least one open end that can facilitate the removal and/or the insertion of the frozen material into the container. In some embodiments, the container may have two or more open ends or the ends may be openable, that is, one or more of the ends can be opened and closed as necessary.

In some embodiments, it may be preferred that the interior volume is about 5 cm$^3$ to about 300 cm$^3$, about 10 cm$^3$ to 200 cm$^3$ or about 20 cm$^3$ to about 100 cm$^3$.

The frozen material that is disposed with the container may be any edible material known or to be developed in the art. Examples may include, for example, ice cream, ice milk, sherbet, sorbets, frozen yogurt, granitas, frozen custard, water ice, frozen non-dairy confection, and mixtures thereof. In some embodiments, it may be preferred that the frozen material has a "creamy" mouth feel, even if the material is itself non-dairy.

The material is frozen, that is, having a temperature of about −5° C. to about 5° C. or about −3.3° C. or greater. Alternatively, the temperature of the frozen material may be about 26° F. to about 40° F. The material may be placed in the container in a frozen state or it may be frozen once in the container.

In some embodiments, it may be preferred that the frozen material (when frozen) has a viscosity of about 50 cP, about 60 cP, about 70 cP, about 80 cP, about 90 cP, about 100 cP, about 110 cP, about 120 cP, about 130 cP, about 140 cP, about 150 cP, about 160 cP, about 170 cP, about 180 cP, about 190 cP, about 200 cP, about 210 cP, about 220 cP, about 230 cP, about 240 cP, about 250 cP, about 260 cP, about 270 cP, about 280 cP, about 290 cP, about 300 cP, about 500 cP, about 700 cP, about 900 cP, about 1000 cP, about 1300 cP, about 1500 cP, about 1700 cP, about 1900 cP, about 2000 cP, about 2300 cP, about 2500 cP, about 2700 cP, about 2900 cP, and about 3000.

Once the frozen material is disposed in the container and is of the desired temperature and viscosity, the temperature of the material is reduced to about 122° C. or less. A first surface of the frozen material is placed in contact with an interior surface of a substrate.

The substrates used in the process of the invention (both first and second substrates, independently) may be any known or to be developed in the art, and can include cookie-type or cracker-type, with sufficient strength the bear the load of the amount of frozen material that is applied to it.

It may be preferred, in some embodiments, that such substrates are relatively low moisture, for example, having a moisture content of about 5% or less by weight. In the same or in an alternative embodiment, it may be preferred, in some embodiments, that the substrates independently have a fat content of about 5% to about 30% by weight.

The substrates may have any dimension desired as long as the load bearing functionality of the substrate is maintained. The dimensions (particularly the thickness along the z-dimension) may vary depending on the ingredients used in the substrate. For example, if the ingredients used in the substrate create a mechanically strong substrate, the thickness may be lesser than if the ingredients used to prepare the substrate create a mechanically weaker substrate. In some embodiments, it may be desirable that the surface(s) of the substrate that are to be in contact with the frozen material are treated or coated with a component that prevents or reduces the amount of moisture that migrates into the substrate from the frozen material. As an example, the substrate may be coated with an edible oil or gum. In some cases, one may coat the substrate with an edible polymer, such as an acrylate or methacrylate polymer or copolymer. Examples of such components are disclosed in, for example, U.S. Pat. No. 5,789,008, the contents of which are incorporated herein by reference.

In the practice of the method of the invention, at least a portion or a first surface of the frozen material is placed in contact with an interior surface of a first substrate (e.g., in an ice cream sandwich-type configuration, in contact with a surface of the substrate cookie that will be on the inside of the closed face ice cream sandwich). When in contact with the substrate, the frozen material is then removed from the container, either by gravity, directly or indirectly applied force, mechanical, thermal or chemical means.

Upon removal from the container, a layer of frozen material is disposed upon the substrate's interior surface, and a first surface of the frozen material contacts an interior surface of the first substrate and a second surface of the frozen material is located in a hypothetical plane above the plane of the first substrate.

In some embodiments of the invention, it may be desirable to manipulate the second surface of the frozen material to make it less smooth, to facilitate the acceptance of the filling material. For example, one may manipulate the second surface of the frozen material to include uniform or non-uniform, discrete or non-discrete, continuous or discontinuous cavities in the surface of the frozen material. Such cavities make take the form of, for example, such as holes, pockets, channels, valleys, ruggae, undulations, "hashtag" patterns, and other uniform or non-uniform patterns. In some embodiments, it may be desirable to include a cavity forming device in the interior surfaces of the aliquot container, so that an extra manipulation step is not necessary to create the cavities. In an embodiment, the cavities formed are about 0.1 cm to about 0.5 cm deep.

A filling in a specified amount is them disposed upon the second surface of the frozen material. It may be preferred that the filling has a temperature of about 0° C. about 21° C., in some embodiments. The filling thus deposited forms a layer that is in contact with the second surface of the frozen materials.

In many embodiments, the filling preferable has flavor and/organoleptic profile that contrast with that of the frozen material. For example, it may be preferred that the chosen filling contains at least one vegetable (e.g., a plant-derived ingredient), such as, for example, a fruit, a vegetable, an herb, a bark, a fungus, or an algae to contribute flavor or texture. Specific ingredients may include, without limitation, apples, pears, beets, tomatoes, strawberries, pecans, chanterelles, yams, sweet potatoes, pumpkin and other squash, blackberries, blueberries, peaches, apricots, currants, lemons, rhubarb, coconut, cinnamon, walnut, lime, banana, etc. In more exotic embodiment, the filling may include meat, seafood or poultry components, such as, for example, sea urchin, roe, mincemeat, quail, guinea fowl, etc. It is preferred that the filling comprises a sauce or gel like carrier into which the meat, nut, or vegetable matter is disposed in a granular, particulate or minced form. Other particulate may also be included in the filling, such as chocolate bits or chips, candy pieces, marshmallows, chunks of cookie, brownie, cookie dough, etc. and the like.

If desired, a second substrate may be applied to the second surface of the filling to form a closed-face sandwich construction. The end result is the formation of a stratified frozen confection having a least two layers disposed between a first substrate and a second substrate.

The confections may be packaged by any means known to be developed in the art. Placement in bags, boxes, disposable and non-disposable containers in contemplated, in individual or multi serving sizes is contemplated.

In some embodiments, it may be desirable that confection is included with a handle or other device to aid in hand to mouth consumption. Example may include a baton, a popsicle stick, a paper wand, a spoon, a fork and a knife.

The above description discloses the process of the invention in a general manner. Any alterations and refinements could be made by a person of skill in the art while still practicing within the scope of the inventive process and any conventional production apparatus may be adapted to practice the methods of the invention.

Example 1

Exemplary Practice of Process to Prepare Ice Cream Sandwiches

About 2.5 to 3 grams of ice cream in its initial temperature and viscosity is deposited into a single serving size scoop shaped container. The deposit into the scoop is carried out either directly from the ice cream production machine or from a temperature-controlled reservoir that is filled b r the ice cream production machine.

The individual scoop container is approximately the same volume and configuration of a typical manual ice cream scoop with a releasing lever that scrapes and releases the ice cream from the scoop or with a plunger that pushes the ice cream from the scoop. In a production line, several (numerous) individual scoop containers are arranged together in an assembly and will be aligned individually or in a series with a mechanical trigger to engage the release lever or plunger.

Once the individual scoop containers of the assembly are filled with ice cream, they enter a temperature-controlled chamber that reduces the temperature of the ice cream to about 10 degrees Fahrenheit. A cookie bottom may or may not be placed on the open end of the scoop by mechanical means before entering the temperature-controlled chamber. If so it may be placed on the scoops by means of a hopper holding multiple cookies. If not the "hopper" wilt place the cookies directly onto a conveyor belt.

When the ice cream is at about 10° F., the scoop assembly may exit the temperature-controlled chamber, and is rotated about 180°. If the bottom cookie is placed on the scoop before the initial temperature-controlled chamber, the cookie along with the ice cream will be freed from the scoop using the releasing lever or plunger and placed on a conveyor belt. If the bottom cookie is not placed on the scoop before the chamber it will be placed on a conveyor belt, positioned under the scoop and accept the ice cream once it is released from the scoop via the release lever or plunger. In either case (cookie before chamber or after chamber) the end result of the first step of the process is an individual scoop of ice cream, whose temperature is approximately 10° F., deposited on a cookie. The bottom cookie/ice cream assembly is then positioned on a conveyor belt. To allow the release of the bottom cookie/ice cream assembly from the scoop, its release from the scoop will have to occur at a height above the conveyor belt equal to the thickness of the bottom cookie/ice cream assembly or the scoop assembly will have to raised mechanically to allow the bottom cookie/ice cream assembly to pass under the scoop assembly.

The ice cream placed on the bottom cookie will be in the shape of a dome and will need to be flattened in order to accept the flavored materials and the top cookie. To do so the bottom cookie/ice cream assembly wilt be positioned under a piston or a series of pistons whose length of stroke can be controlled to regulate the thickness of the ice cream deposit. The surfaces of the pistons are either treated with a non-stick covering or slightly heated to allow for the release of the ice cream from the surface of the piston. Alternatively, the release of the ice cream might also be effectuated by a slight shaking of the piston assembly to loosen the ice cream from the surface of the piston.

The surface of the piston will be undulating creating a surface with small pockets that will accept the flavored material. The individual pistons will have different surface patterns creating different pockets or the cavity on the top surface of each flattened scoop of ice cream. This may cause the flavored material to be deposited differently on each scoop giving each an individual "homemade" appearance. If the plunger release scoop is utilized the surface of the plunger element of the scoop will be undulated and replace the need for the piston assembly.

The bottom cookie/ice cream assembly is positioned under temperature-controlled reservoirs containing the flavored material. The reservoirs will allow measured amounts of flavored material to be deposited onto the flattened top of the bottom cookie/ice cream assembly. The flavored material will be deposited by utilizing gravity, a pump or a plunger. The temperature control will allow of the flavored material reservoir will allow for the control of the standardization of optimum depositing viscosity of the various viscosities of the flavored materials.

Additionally there will be a reservoir containing solid flavored materials. The s flavored materials will be deposited in measured amounts from a "hopper". When solid flavored materials are deposited on the bottom cookie/ice cream assembly there will need to be another piston assembly to push the solid flavored materials into the ice cream. It may also be necessary to deposit a small additional amount of ice cream in its initial production viscosity and temperature to allow for the adherence of the top cookie to the bottom cookie/ice cream/flavored material assembly.

The reservoirs for the flavored materials, both viscous and solid, will be "componential thereby allowing flexibility in the order of the deposits of the flavored materials and also the number of individual flavored materials deposited on the bottom cookie/ice cream assembly. Once the flavored materials are deposited, the bottom cookie/ice cream/flavored material assembly is positioned under an additional hopper that containing the cookies for use a top layers.

An individual cookie is placed on the assembly. The confection is then moved under an additional piston or a series of pistons whose length of stroke can be controlled. The piston will press the cookie down on the bottom cookie/ice cream/flavored material assembly thus completing the process of constructing the confection.

The confection of the invention is then moved into the final temperature-controlled chamber and its temperature is reduced to approximately negative 10° F. This mitigates the migration of moisture from the ice cream and flavored material into the cookies thus optimizing the crispness of the cookies. It also stabilizes the confection for packaging.

Example 2

Illustrative Filling Formulation—Pecan Filling

For industrial scale processes, it may be preferred that the following formulations are converted to a parts-by-weight formulation. To prepare the filling, the components of Table A are incorporated together as described below:

TABLE A

| Softened salted butter | 1 stick |
|---|---|
| Light brown sugar | 1 cup |
| Amber maple syrup | 1 cup |
| Vanilla extract | 1 teaspoon |
| Salt | 0.5 teaspoon |
| Eggs, slightly beaten | 3 |
| Finely chopped pecans | 1 cup |

The butter and sugar are creamed together, and subsequently the vanilla, salt and syrup are blended in. The eggs are blended in until completely mixed, and the pecans are incorporated. The filling is baked at 300° F. for about 40 minutes, or until it reaches the uniform temperature of 40 to 45° F., at which time it is suitable for dispensing.

Example 3

Illustrative Filling Formulation—Key Lime Filling

For industrial scale processes, it may be preferred that the following formulations are converted to a parts-by-weight formulation. To prepare the filling, the components of Table B are incorporated together as described below:

TABLE B

| Cream cheese | 16 ounces |
|---|---|
| Condensed milk, sweetened | 28 ounces |
| Lime juice (w or w/out pulp) | 12 ounces |
| Salt | 1 teaspoon |

Cream cheese and condensed milk are whipped together, after which the lime juice and salt is added. The mixture is suitable for dispensing at about 32° C. to 35° C.

Example 4

Illustrative Filling Formulation—Cherry Butter

For industrial scale processes, it may be preferred that the following formulations are converted to a parts-by-weight formulation. To prepare the filling, the components of Table C are incorporated together as described below:

TABLE C

| Tart cherries, pitted and pureed | 20 ounces |
|---|---|
| sugar | ¾ cup |
| Lemon juice | 1 tablespoon |
| Almond extract | ½ teaspoon |
| butter | 4 tablespoons |

TABLE C-continued

| flour | ¼ cup |
|---|---|
| Salt | ½ teaspoon |
| cherry juice | 4 ounces |

The contents of Table C are combined, brought to a boil and allowed to boil for about 5 minutes. The filling is suitable for dispensing at about 40° C. to about 45° C.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A stratified frozen confection for hand consumption prepared by
    a. filling an aliquot container defining a three dimensional shape with at least one open end with an amount of a frozen material, the frozen material having a viscosity of about 50 cP to about 5000 cP and an internal temperature of about −3.3° C. (26° F.) or greater, the frozen material selected from the group consisting of ice cream, ice milk, sherbet, frozen yogurt, frozen custard, water ice, frozen non-dairy confection, and mixtures thereof;
    b. reducing the temperature of the frozen material within the container to about −12.2° C. (10° F.) or less;
    c. placing a first surface of the frozen material in contact with an interior surface of a first cookie substrate, the first cookie substrate having a length dimension and a width dimension, and the first cookie substrate having a moisture content of 5% or less by weight and a fat content of between 5% and 30% by weight;
    d. removing the frozen material from the aliquot container, thereby forming a layer of frozen material disposed upon the interior surface of the first cookie substrate, the first surface of the frozen material in contact with the interior surface of the first cookie substrate and a second surface of the frozen material positioned in a plane above the plane of the first cookie substrate;
    e. manipulating the second surface of the frozen material to place at least one cavity in the second surface, the at least one cavity forming a pattern on the second surface of the frozen material, the at least one cavity having a depth in the range of at least about 0.1 cm up to a thickness of the frozen material;
    f. disposing upon the second surface of the frozen material an amount of a filling sufficient to fill the at least one cavity in the second surface of the frozen material, wherein the filling is formed of a flavored sauce or gel and has an internal temperature of up to about 20° C., the filling forming a filling layer having a first filling surface in direct contact with the second surface of the frozen material and a second filling surface; and
    g. applying a second cookie substrate into direct contact with the second filling surface, the second cookie substrate having a width dimension and a length dimension substantially the same as the first cookie substrate, and the second cookie substrate having a moisture content of 5% or less by weight and a fat content of between 5% and 30% by weight,
    thereby forming a stratified frozen confection having at least two layers disposed between the first cookie substrate and the second cookie substrate, wherein the filling layer fills the at least one cavity in the second surface of the frozen material, and wherein the first cookie substrate and the second cookie substrate are the outermost layers of the stratified frozen confection.

2. The stratified frozen confection of claim 1, further comprising a coating having at least one of chocolate, caramel, peanut butter, cocoa butter, a nut, a crumb, and a fruit.

3. The stratified frozen confection of claim 1 further comprising a handle disposed within the at least two layers.

4. A stratified frozen confection for hand consumption comprising:
- a frozen material having a temperature of about 10° F. or less, the frozen material selected from the group consisting of ice cream, ice milk, sherbet, frozen yogurt, frozen custard, water ice, frozen non-dairy confection, and mixtures thereof, the frozen material forming a three dimensional body having a first surface, a second surface, and a thickness between the first and second surfaces, at least one cavity formed on the second surface and penetrating into the three dimensional body, the at least one cavity forming a pattern on the second surface and having a depth into the three dimensional body in the range of about 0.1 cm to about 0.5 cm,
- a first cookie substrate and a second cookie substrate, the first and second cookie substrates having a moisture content of 5% or less by weight and a fat content of between 5% and 30% by weight, and the first cookie substrate and the second cookie substrate are the outermost layers of the stratified frozen confection,
- a filling layer formed of a sauce or a gel and including a flavored material disposed between the second cookie substrate and the frozen material, the filling layer filling the at least one cavity and extending across the second surface in the pattern defined by the at least one cavity,
- wherein the frozen confection has at least two layers disposed between the first cookie substrate and the second cookie substrate, with the first surface of the frozen material positioned on and in contact with the first cookie substrate, the filling layer positioned within the at least one cavity of the frozen material, and the filling layer in direct contact with the second cookie substrate.

5. The confection of claim 4, wherein the filling layer has a viscosity that is less than the viscosity of the frozen material.

6. The confection of claim 4, wherein the amount of flavored material within the filling layer is about 5 gms to about 70 gms.

7. The confection of claim 4, wherein the filling layer comprises a fruit or a vegetable.

8. The confection of claim 4, further comprising a coating formed from at least one of chocolate, caramel, peanut butter, cocoa butter, a nut, a crumb, and a fruit.

9. A stratified frozen confection for hand consumption comprising:
- a first frozen material selected from the group consisting of ice cream, ice milk, sherbet, frozen yogurt, frozen custard, water ice, frozen non-dairy confection, and mixtures thereof, the first frozen material having a top surface, a bottom surface and a thickness there between, the top surface of the first frozen material having a plurality of defined cavities formed in a pattern across the top surface, the plurality of cavities having a depth in the range of at least 0.1 cm up to the thickness of the first frozen material,
- a first cookie substrate and a second cookie substrate, the first and second cookie substrates having a moisture content of 5% or less by weight and a fat content of between 5% and 30% by weight, and the bottom surface of the first frozen material position on the first cookie substrate, and
- a filling layer in the form of a flavored sauce or a gel and disposed on the top surface of the first frozen material, the filling layer filling the plurality of cavities, the filling layer positioned in direct contact with the second cookie substrate,
- wherein the first cookie substrate and the second cookie substrate are the outermost layers of the stratified frozen confection, and
- wherein the stratified frozen confection has at least two layers disposed between the first cookie substrate and the second cookie substrate and the filing material is in direct contact with the second cookie substrate, and
- wherein the cavity pattern creates an irregular thickness for the filling material across the top surface of first frozen material.

10. The confection of claim 9, wherein the plurality of cavities within the top surface of the first frozen material have a uniform pattern.

11. The confection of claim 9, wherein the plurality of cavities within the top surface of the first frozen material have a non-uniform pattern.

12. A stratified frozen confection for hand consumption comprising:
- a frozen material forming a three-dimensional body having a top surface, a bottom surface and thickness, the frozen material selected from the group consisting of ice cream, ice milk, sherbet, frozen yogurt, frozen custard, water ice, frozen non-dairy confection, and mixtures thereof, a plurality of cavities penetrating into the top surface, the cavities forming a surface with pockets having irregular dimensions and combining to form undulations on the top surface of the frozen material,
- a first cookie substrate and a second cookie substrate, the first and second cookie substrates having a moisture content of 5% or less by weight and a fat content of between 5% and 30% by weight, and the bottom surface of the frozen material contacting the first cookie substrate, and
- a filling layer formed as a sauce or a gel and including a flavored material, the flavored material disposed on the top surface of the frozen material and filling the plurality of cavities, the flavored material having a varying thickness due to the formed undulations of the pockets on the top surface of frozen material, and
- the second substrate forming the top layer of the stratified frozen confection, the filling layer in direct contact with the second cookie substrate,
- wherein the frozen confection comprises at least two layers disposed between the first and second substrates, and wherein the individual bites of the frozen confection during consumption have different flavor combinations resulting from the filling in the formed undulations in the frozen material.

13. The confection of claim 12, wherein the plurality of cavities are formed in a uniform pattern across the top surface.

14. The confection of claim 12 wherein the plurality of cavities have a depth in the range of 0.1 cm up to a thickness of the three dimensional body of the frozen material.

15. The confection of claim 12 wherein the plurality of cavities have a depth in the range of about 0.1 cm to about 0.5 cm.

16. The confection of claim 12 wherein the filling layer further comprises an edible particulate within the flavored material, the particulate selected from the group consisting of chocolate bits, flavored chips, candy pieces, marshmallows, chunks of cookie, brownie, cookie dough, or combinations thereof.

\* \* \* \* \*